United States Patent
Kveler et al.

(10) Patent No.: US 12,511,324 B1
(45) Date of Patent: Dec. 30, 2025

(54) CONTEXT-AWARE DOMAIN-SPECIFIC CONTENT FILTERING

(71) Applicant: Microsoft Technology Licensing, LLC, Redmond, WA (US)

(72) Inventors: Ksenya Kveler, Nesher (IL); Einat Gruda Idelovitch, Herzliya (IL); Bert Jozef Prosper Hoorne, Knesselare-Oost Vlaanderen (BE); Tal Baumel, Tel-Aviv (IL); Hadas Bitran, Ramat-HaSharon (IL); Aaron Toby Bornstein, Zikhron Ya'akov (IL); Ran Efrati, Tel-Aviv (IL); Tamar Sidi Maoz, Herzelia (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/940,822

(22) Filed: Nov. 7, 2024

Related U.S. Application Data

(60) Provisional application No. 63/702,113, filed on Oct. 1, 2024.

(51) Int. Cl.
*G06F 16/00* (2019.01)
*G06F 16/335* (2019.01)

(52) U.S. Cl.
CPC .................. *G06F 16/335* (2019.01)

(58) Field of Classification Search
CPC .................................................. G06F 16/335
USPC ...................................................... 707/722
See application file for complete search history.

(56) References Cited

U.S. PATENT DOCUMENTS

| | | | |
|---|---|---|---|
| 12,038,958 B1* | 7/2024 | Soubbotin | G06F 16/335 707/707 |
| 2024/0202221 A1* | 6/2024 | Siebel | G06N 3/092 707/707 |
| 2024/0419706 A1* | 12/2024 | Gutierrez | G06F 40/166 707/707 |

OTHER PUBLICATIONS

"Facebook/bart-large-mnli," Hugging Face, Retrieved on Oct. 13, 2024 at: https://huggingface.co/facebook/bart-large-mnli, 5 pages.
"Azure AI Content Safety—AI Content Moderation", Microsoft Azure, Retrieved on Nov. 7, 2024 at https://azure.microsoft.com/en-us/products/ai-services/ai-content-safety, 7 pages.

\* cited by examiner

*Primary Examiner* — Alexandria Y Bromell
(74) *Attorney, Agent, or Firm* — Barta Jones, PLLC

(57) ABSTRACT

Context-aware content filtering adapted for a knowledge domain is provided. In certain examples, a classification confidence score by a classifier indicates a level of confidence that a prompt from a user is associated with the knowledge domain. The classification confidence score is compared with a threshold. When the score is below a threshold, a violation notice is provided to the user without submitting the prompt to a generative artificial intelligence (GAI) model. When the classification confidence score is above the threshold, the prompt is further processed to determine, according to rules, whether the prompt should be submitted to the GAI model. In various examples, the rules are applied to contextual information, safety score information, and intent information derived from the prompt.

20 Claims, 7 Drawing Sheets

CONTEXT-AWARE DOMAIN-SPECIFIC CONTENT FILTERING

CROSS-REFERENCE TO RELATED APPLICATION

This application claims priority to U.S. Provisional Patent Application No. 63/702,113, entitled "CONTEXT-AWARE DOMAIN-SPECIFIC CONTENT FILTERING," filed on Oct. 1, 2024, the disclosure of which is incorporated herein by reference in its entirety.

BACKGROUND

Addressing safety concerns raised by large language models (LLMs) is a difficult technical challenge facing the new artificial intelligence (AI) technology era, and as such has been the subject of academic research. Existing approaches have either limited the utility of LLMs or not adequately ensured reliable information from LLMs, particularly in sensitive areas such as medicine, law, and education. Various approaches so far undertaken include: (1) training with curated datasets, (2) applying "guardrails" in the form of prompt engineering and instruction tuning, (3) various human oversight mechanisms, and (4) pre-prompt and post-prompt filtering using safety classifiers and detectors.

In pre-prompt filtering, a safety classifier analyzes the prompt to determine if it contains potentially unsafe content, and if so, the prompt is rejected and therefore never submitted to the LLM, and a warning or an alternative response is instead provided to the user. Known pre-prompt safety classifiers use various techniques for detecting harmful content in various "unsafe" categories such as violence or hatred. Once a prompt is identified as pertaining to an unsafe or harmful content category, an appropriate message may be provided to the end user that submitted the prompt.

Traditional pre-prompt filtering works by parsing and tokenizing the prompt, employing keyword and phrase matching, or regular expressions, to identify patterns in the text that might indicate unsafe context; statistical and rule-based approaches to evaluate the probability of a prompt being unsafe; machine learning models trained specifically to detect (i.e., classify) unsafe content; and natural language processing (NLP) techniques such as sentiment or context analysis, to evaluate the tone or intent of the prompt. Generally speaking, however, existing techniques are unable to discriminate between legitimate inquiries into topics related to harmful content categories and harmful content per se, particularly when these topics arise in sensitive knowledge domains such as the field of medicine.

SUMMARY

Example solutions for context-aware domain-specific content filtering are described herein. The disclosed examples are described in detail below with reference to the accompanying drawing figures listed below.

An exemplary method provides context-aware content filtering for providing large language model services specific to a knowledge domain. The method includes operations for receiving a prompt from a user via a user interface and determining, from a classifier, a classification confidence score indicating a level of confidence that the prompt is associated with the knowledge domain. The classification confidence score is compared to a threshold. A violation notice is forwarded to the user interface without submitting the prompt to a generative artificial intelligence (GAI) model when the classification confidence score is below the threshold. Responsive to the classification confidence score being above the threshold, context information is composed from the prompt, the context information comprising structured information extracted from the prompt using an ontology of the knowledge domain. The context information is evaluated according to rules for the prompt, the evaluating producing a result, the result being one of a determination that the prompt violates the rules or a determination that the prompt is not in violation of the rules. When the result is the determination that the prompt violates the rules, a violation notice is forwarded to the user interface without submitting the prompt to a GAI model. When the result is the determination that the prompt is not in violation of the rules, the prompt is submitted to the GAI model and a response from the GAI model is received, which is forwarded to the user interface.

BRIEF DESCRIPTION OF THE DRAWINGS

The disclosed examples are described in detail below with reference to the accompanying drawing figures listed below.

Corresponding reference characters indicate corresponding parts throughout the drawings. Any of the figures or drawings may be combined into a single example or embodiment.

DETAILED DESCRIPTION

Figure 1A:
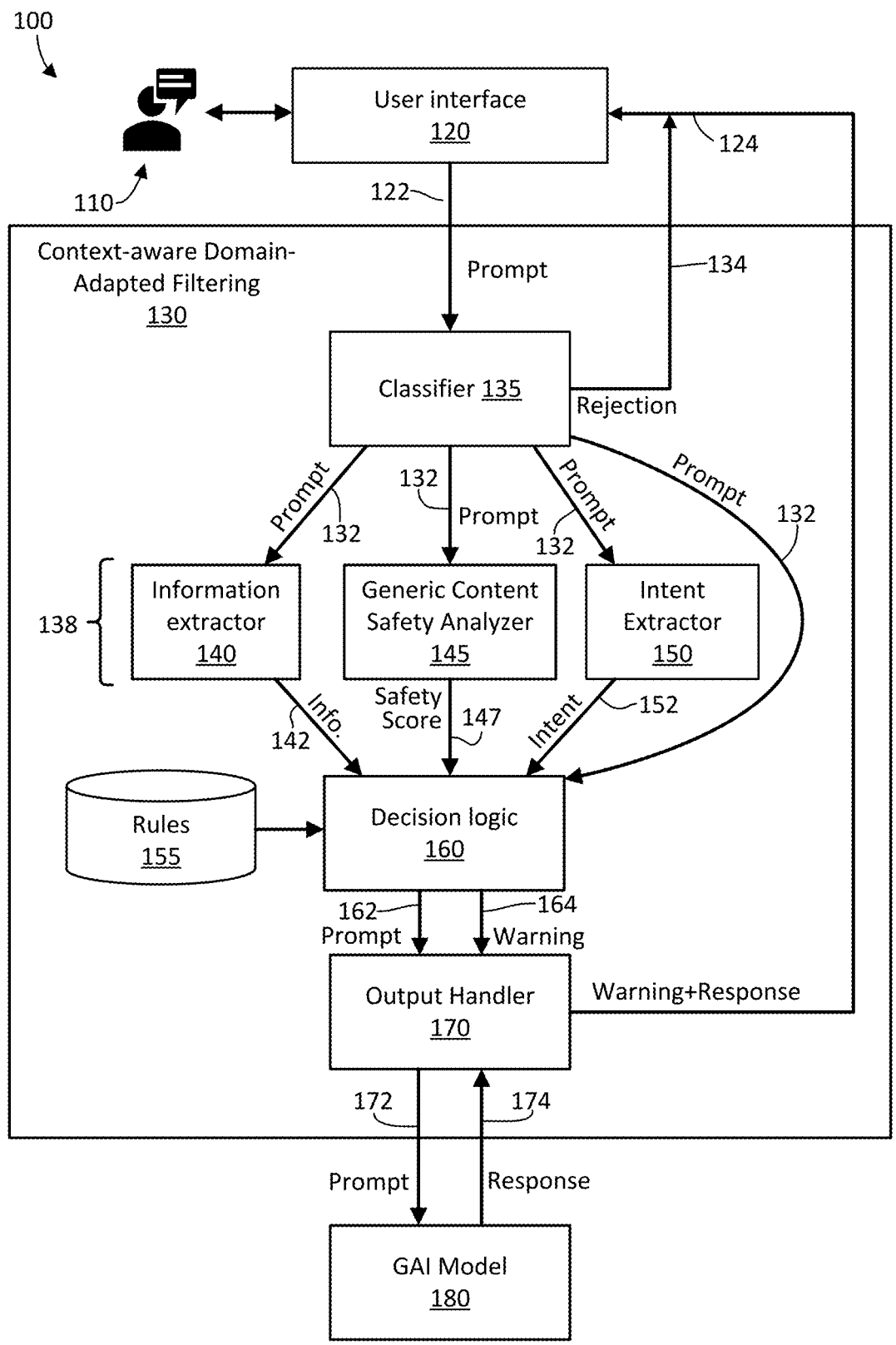
FIGS. 1A and 1B show block diagrams illustrating examples of system architectures for providing a filtering service for a GAI model.

Generative artificial intelligence (GAI) models are transforming information technology. These computational models, which include large language models, small language models, and multi-modal models, etc., can provide strikingly adept and comprehensible information on virtually any topic imaginable. However, since their inception they have been vexed by safety concerns, of which there are a few types. A first type of safety concern is that GAI models occasionally give incorrect information confidently presented by the GAI model as correct and reliable. This can lead to unfavorable outcomes.

Another type of safety concern is the provision of information that is generally truthful, but where that information may be dangerous for certain sensitive individuals to receive. An example is the provision of sexual or violent content to minors, or medication information to individuals without any medical instruction (e.g., dosage information) by a medical professional on the use of that information or who can determine if the information is appropriate to the person's properly diagnosed medical conditions.

Current approaches to mitigating these safety concerns have made it difficult in certain fields such as medicine to enable GAI models to provide useful information that relates to potentially harmful content categories. In contrast, the presently described system and service for filtering harmful content more precisely detects, using rules for evaluating data extracted from a prompt, when it is suitable to submit the prompt to the GAI model and when it could be potentially harmful. As such, content related to content categories deemed harmful may be tolerated by the filtering service if it can determine with a high level of confidence that the prompt is a legitimate prompt directed to the particular knowledge domain (e.g., medicine, education, law) of the service. As an example, an image showing (or description of) a gunshot wound may be flagged by a generic content filter as being too violent, but the present filtering system can determine if the image is appropriate to a medical question regarding the gunshot wound—e.g., prognosis or treatment possibilities for the gunshot wound.

Overall, examples of the disclosure improve user interaction by improving usability of GAI models in a safe way and more accurately reject inappropriate or illegitimate prompts while accepting legitimate prompts that, despite containing harmful content, are legitimately directed to a specific knowledge domain. This increased accuracy improves the overall usefulness of the GAI model while reducing risks to users as well as to service providers who can be potentially held accountable for the material generated by the GAI model. Furthermore, by restricting prompts to ones directed to a legitimate intent (i.e., an approved category of sought information) the risk that the GAI model will generate inaccurate content can be mitigated. Additionally, filtering the prompts before submitting to the GAI model, by applying the rules, reduces the number of prompts processed by the GAI model thereby advantageously reducing the processing resource usage by the GAI model.

Figure 1B:
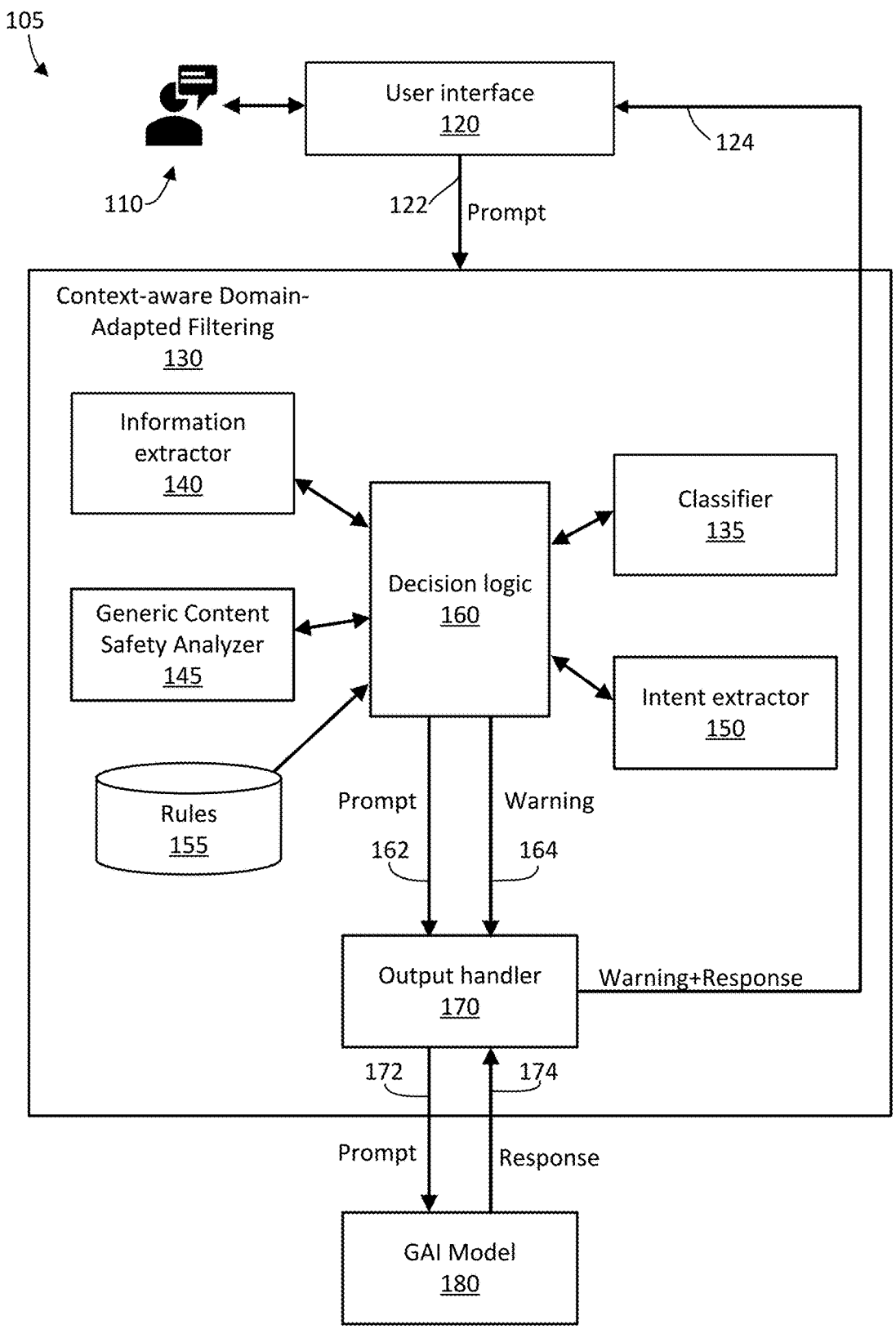

FIGS. 1A and 1B show block diagrams 100 and 105, respectively, illustrating examples of system architectures for providing, to a user, access to a language model, including respective example architectures of a context-aware prompt filtering service therefor. The systems include a user interface (UI) 120 for receiving inputs and providing outputs to a user 110, a context-aware domain-adapted filtering service 130 (also referred to as a context-aware prompt filtering service) for receiving prompts 122 via UI 120, and an GAI model 180 for receiving prompts and generating responses thereto.

User interface 120, in various examples, comprises one or more discrete systems enabling user interaction with service 130 and GAI model 180. In an exemplary implementation, user interface 120 includes a primary UI system in the form of an application programming interface (API) (not shown) for receiving and responding to communications from a secondary UI system (not shown). The secondary system may include a third-party server providing a "front end" service to users 110 via tertiary UI systems such as mobile applications, web-browsers etc. for direct interaction with users 110 using devices (not shown) operated directly by users 110. The primary and secondary UI systems may each be independently deployed and operated by different entities, either in public cloud-based data centers or on-premises datacenters maintained and/or managed by the different entities. In this case, the primary and secondary systems may be deployed with scalable infrastructure and associated with appropriate firewalls, load balancers, and so forth as appropriate. The term "scalable infrastructure" can refer to any sort of infrastructure in which multiple instances of an application, or component thereof, can be replicated and scaled-out to accommodate increasing loads, and likewise, removed from service in response to decreasing loads. Scalable infrastructures include virtualization-based technologies including hardware server virtualization, and containerization. In some examples, service 130 is cloud-based, i.e., executes in a cloud or datacenter environment, e.g., using scalable infrastructure.

In a different example, user interface 120 itself is a web server, or a collection of webservers configured behind a load balancer that are accessible by a user's web browser, or application servers accessible by a user's mobile or other type of application. As with the prior example, in this implementation, service 130 is cloud-based (e.g., executes in a cloud or datacenter environment) and uses scalable infrastructure.

In another example, service 130 may be deployed as an application or a component of an application directly within a user's device, while user interface 120 comprises physical user interfaces such as display screen, touchscreen, mouse, touchpad, keyboard, microphone, speakers, camera, etc.

GAI model 180 is a trained GAI model that resides either in a cloud or datacenter or locally on a user's endpoint device. GAI models are generally trained using a complex and resource-intensive process using vast amounts of data and powerful computing infrastructure. Data may be collected from public and private data sources including via web crawlers and privately operated libraries such as trade journal compilations. GAI models are built using deep neural networks, and largely focus on written natural language although multimodal GAI models are known and are contemplated for GAI model 180. Once GAI model 180 is trained, it is typically deployed in an environment tailored to their specific requirements. In one example, GAI model 180 is deployed in cloud environments providing scalable infrastructure, which allows GAI model 180 to handle varying loads and to provide high availability. In an alternate example, GAI model 180 is deployed on an edge device (e.g., a user's computer or mobile system) suitable for the GAI model. GAI model 180 may be a domain-specialized or a generalist GAI model.

Service 130 is interposed between user interface 120 and GAI model 180 and includes a number of functions that operate together to provide safety constraints. These functions include classifier 135, information extractor 140, generic content safety analyzer 145, intent extractor 150, rules 155, decision logic 160, and output handler 170. Each function may be implemented as a separate application or microservice for service 130, or as functions or procedures within a unified application providing service 130. Various functions may be combined so that a fewer number of discrete functions, services, or procedures are provided, and individual functions can be divided into smaller microservices to provide individual sub-functions as separate entities, e.g., for more efficient computing resource consumption and scalability and/or improved maintenance and improvement. As such, each function may be independently deployed as a separate scalable service or entity on distinct hardware or in different datacenters or clouds.

Classifier 135 determines, for an input prompt, a confidence score that the prompt is related to a particular knowledge domain. The intention of service 130 being to focus on a particular knowledge domain, such as the field of medicine, classifier 135 identifies prompts that are unrelated to that field and should therefore be rejected. In an example implementation, classifier 135 is a multi-modal classifier capable of analyzing text, images, video, and audio input to determine if any prompt submitted is directed to the specific knowledge domain. In the medical domain, for example, the classifier determines whether or not the prompt is clinical in nature. In an example implementation, a generic natural language inference (NLI) is employed to detect a relationship between the prompt and a definition of the knowledge domain. Other techniques, such as an NLP and purpose-trained traditional machine learning models or deep learning models are or may become available to detect a confidence measure that the prompt is related to a particular knowledge domain.

In the exemplary architecture 100 shown in FIG. 1A, classifier 135 receives prompt 122 from user interface 120 and generates therefrom a confidence score that the prompt is related to the knowledge domain of service 130. The confidence score is compared to a configurable threshold. If the confidence score fails to exceed the threshold, then the prompt is rejected, and a rejection message 134 is returned to user interface 120. Otherwise, prompt 132, which is merely a copy of prompt 122, is sent to each of information extractor 140, generic content safety analyzer 145, intent extractor 150, and decision logic 160.

In the exemplary architecture 105 shown in FIG. 1B, classifier 135 receives prompt 122 and returns the classification confidence score to decision logic 160 in response thereto. Decision logic 160, in an example implementation, compares the confidence score with a threshold defined in rules 155 to determine whether the prompt should be rejected if the confidence score suggests that classifier 135 is insufficiently confident (e.g., if the confidence score is below a threshold) that prompt 122 is unrelated to the knowledge domain of service 130, or further processed by service 130.

Information extractor 140 parses input prompt 122 and extracts concepts and relationships therebetween using a domain-specific ontology. Domain-specific ontologies provide a structured representation of knowledge within a particular domain, including concepts, relationships, and hierarchies. In the medical field, for example, a medical ontology might include diseases, symptoms, treatments, anatomical terms, and their interrelations.

Figure 2:
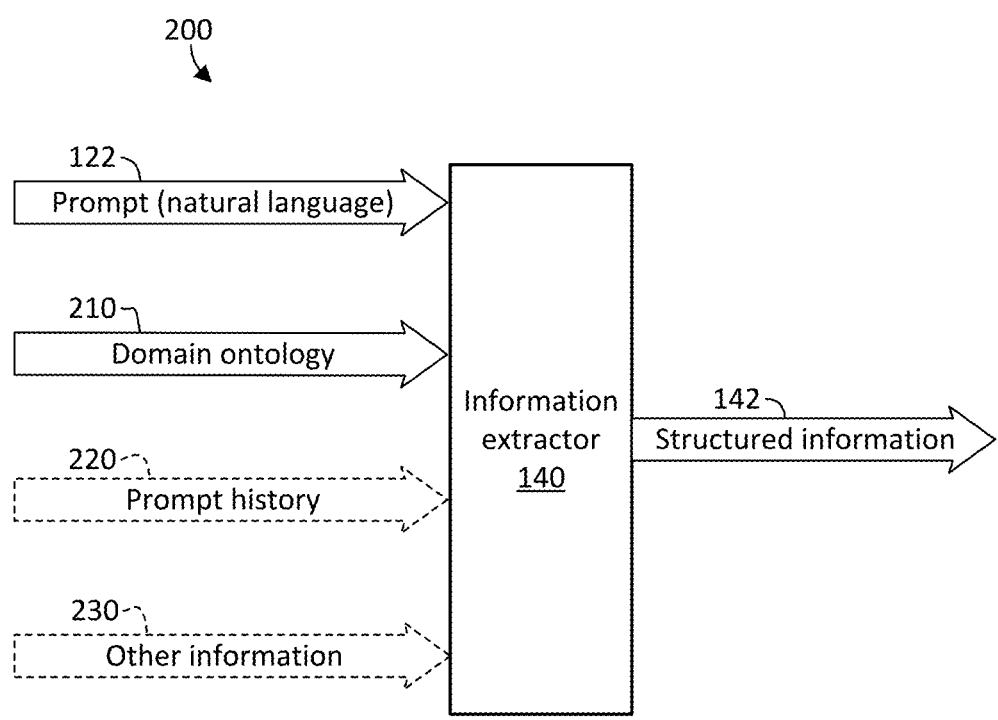
FIG. 2 shows a schematic diagram illustrating inputs and outputs of an exemplary information extractor.

FIG. 2 shows a schematic diagram 200 illustrating inputs and outputs of information extractor 140. In one implementation, information extractor 140 parses each prompt 122 in isolation and analyzes it only with respect to it and the domain-specific ontology 210 to generate structured information 142. In another example, information extractor 140 receives prompt 122, and include, in addition thereto, a prompt history 220 containing a record of past prompts submitted by a particular user 110 to generate structured information 142. It is also possible for information extractor 140 to generate new structured information for the current prompt and compile that structured information with previously generated structured information to produce output structured information 142.

In yet another example, other information 230 regarding user 110 is made available to information extractor 140, such as a patient's medical record. For example, a patient or medical practitioner submitting a query into GAI model 180 allows GAI model 180 to access a patient's medical file to provide additional context to the prompt, so that the additional context of the patient's prompt is considered with the prompt to determine how service 130 should process the prompt. As such, by making available this additional context information of user 110, the handling of prompt 122 is tailored to the specific circumstances of that user.

Structured information 142 may be generated using ontology 210 to identify concepts presented in prompt 122 and relationships between those concepts, and/or additional information including the prompt history 220 and other information 230. In one example implementation, structured information 142 is generated as a JavaScript Object Notation (JSON) record.

Figure 3:
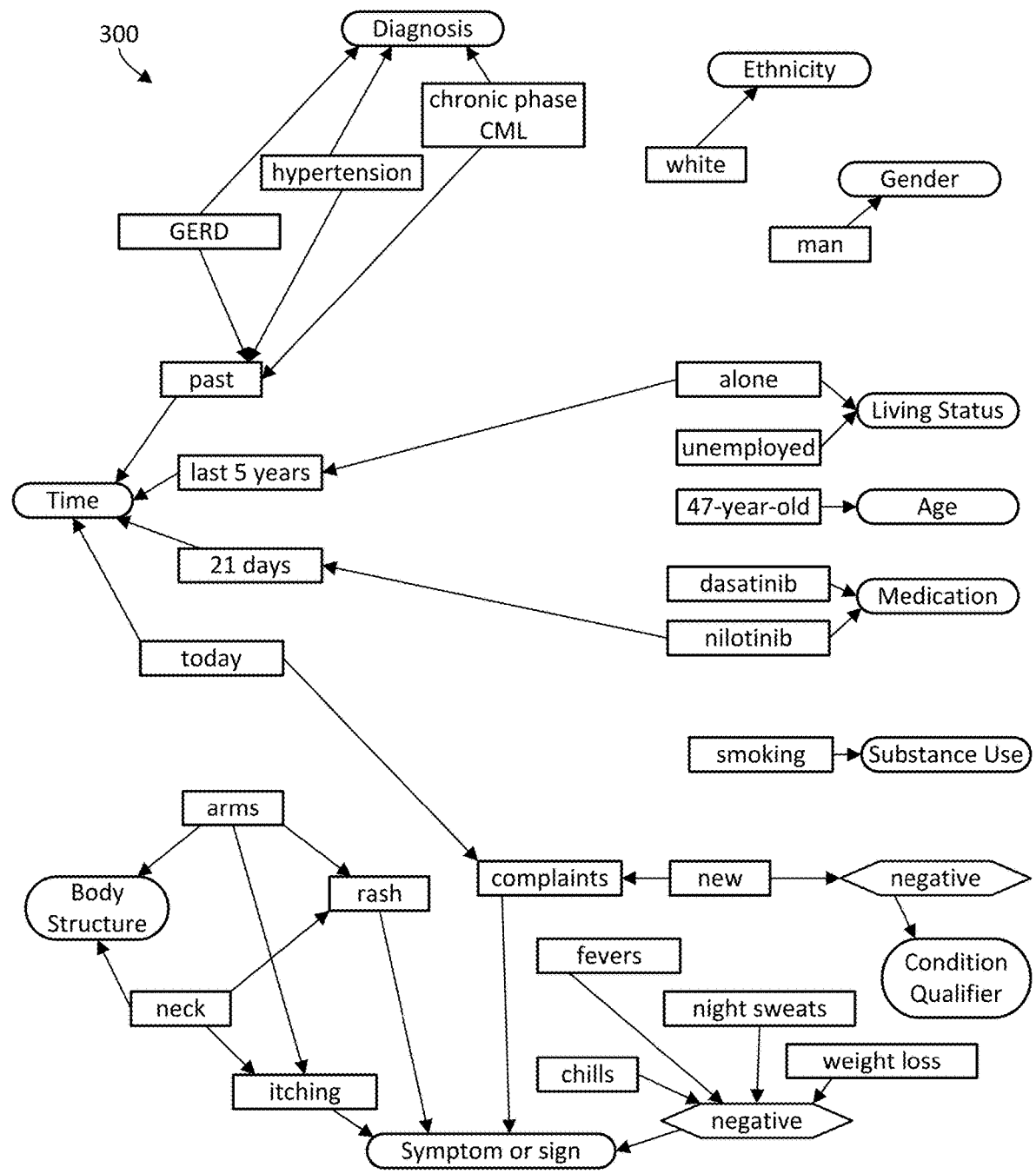
FIG. 3 shows a graph illustrating a representation of exemplary structured contextual information.

FIG. 3 shows a graph 300 illustrating by way of example a representation of a possible structured information 142. This graph illustrates structured information 142 generated from the prompt, "The patient is a 47-year-old white man with history of hypertension, GERD, and chronic phase CML. History of smoking, lives alone for the last 5 years, unemployed. He has been taking nilotinib for 21 days. He does have itching and rash on his neck and arms; however, states this is more tolerable than the rash he had on dasatinib. No new complaints today. Denies chills, fevers, night sweats, or weight loss." Information extractor 140 employs a processing engine to recognize named entities and these are linked to concepts in the ontology. Pattern-based methods, machine learning, dependency parsing and/or other appropriate techniques are employed to extract relationships between entities mentioned in the text. Once this is done, the entities and relationships are mapped to corresponding concepts in the ontology and finally a structured representation is generated using the ontology's schema.

The structured format can be used to construct a knowledge graph that represents the entities and their relationships as a network. The graph can then be serialized and documented using a structured data exchange format such as JSON. The graph structure of structured output 142 allows for complex querying by decision logic 160 when applying rules 155, as further described below.

Generic content safety analyzer 145 generates, in response to a received prompt 132 (a copy of prompt 122) general confidence scores for one or more harmful content categories. Each confidence score can, in one implementation, be a number between zero and one, with zero being considered "safe" and one being considered "unsafe." Of course, other numerical scales can be selected in different implementations. In some examples, generic content safety analyzer 145 is of a type that is in common use today in pre-prompt filtering as previously described. An example of such pre-prompt filtering is the Azure® AI Content Safety. However, rather than simply blocking prompts based on confidence scores, the confidence score is instead provided to decision logic 160 for further handling as described in more detail below.

In an example implementation, generic content safety analyzer 145 performs text, image, and video moderation using various techniques. Text is analyzed using natural language processing (NLP) techniques to understand the context and detect harmful content such as inappropriate language. Computer vision models are employed to detect unsafe images and video input. Based on the analysis, generic content safety analyzer classifies the content as "adult," "offensive," "self-harm," or "violent." A confidence score is applied to each harmful content category that ranges from zero (no confidence) to one (highly confident) that the prompt contains harmful content of the corresponding harmful content category. In other words, the confidence score represents a determination as to a likelihood that the prompt is properly associated with the particular harmful content category and as such can be considered a measure of the strength of the association between the prompt and the harmful content category.

Once a confidence score is determined for each harmful content category, the scores are provided back to decision logic 160 on the basis of each individual prompt.

Intent extractor 150 provides another layer of classification to prompt 122. For example, after determining that prompt 122 is clinical using classifier 135, intent extractor 150 is capable of identifying a category of information being sought by user 110, which will be a subcategory of the knowledge domain of service 130. In the case of a medical knowledge domain, the intent extractor can, e.g., identify a type of medical question. For example, if generic content safety analyzer 145 identifies violent or sexual content, intent extractor can discriminate between whether user 110 is requesting information on how to commit violence or sexual assault, or how to deal (e.g., medically) with the impact of violence or sexual assault on the user's well-being. Intent extractor can utilize NLI tools or specifically trained machine learning models to detect and provide a confidence score relating prompt 122 to one or more domain topics or domain subcategory of the knowledge domain of service 130.

Rules 155 may be arbitrarily defined that query results of any or all of functions 135-150 to determine a disposition of prompt 122. The possible dispositions include rejection, approval with warning, or approval. A rejection response or warning may be defined by rules 155 based on results of the application of rules 155 by decision logic 160, as further described below with reference to FIGS. 4 and 5.

In one example implementation, a plurality of independent sets of rules are each defined by a corresponding third-party provider, and different rules can be defined for different classes of users for which the third-party provider provides access. For example, a hospital may have a web portal for GAI model access by patients, medical staff, and doctors, and each of these classes of users may be subject to different sets of rules governing their use of GAI model 180. A second third-party provider, such as a medical insurance provider, may make GAI model 180 available via service 130 to call-center nurses and insureds, with different sets of rules for each class of user that are defined independently of the rules defined by the aforementioned hospital. As an example, an insurance provider may permit questions related to medical insurance concepts whereas a hospital may choose to only allow questions related to medical conditions and treatments. As another example, a patient is permitted by rules 155 to request information as to the side-effects of a particular medication, but may be prohibited from requesting any information pertaining to dosage, whereas a doctor may query GAI model 180 for dosage information, but a warning may be generated for the doctor indicating that GAI model 180 should not be relied upon for dosage guidance of medications.

Decision logic 160 comprises a number of functions to carry out a method as described in more detail below with references to FIGS. 4 and 5. As will be further explained, decision logic 160 performs a number of operations on each prompt and each operation may be performed by a separate function or software routine that each processes successive prompts in pipeline fashion simultaneously with other functions performing other operations. Decision logic 160 may therefore be deployed as a unitary application or as a segmented set of microservices that each communicate with one or more of functions 135-150.

Decision logic 160 generates a result based on prompt 122, information regarding prompt 122 from functions 135-150, and rules 155. The result may be a rejection of prompt 122, an approval of prompt 122, or a qualified approval in which a warning message 164 is provided appropriate to the prompt as determined by rules 155. Prompt 162 is sent by decision logic 160 to output handler 170 is identical to prompt 122 received from user interface 120. Warning message 164 is optionally provided to output handler 170 based on rules 155 as will be further described below with reference to FIGS. 4 and 5.

In example architecture 100 shown in FIG. 1A, information extractor 140, generic content safety analyzer 145, and intent extractor 150 (collectively referred to as "functions" 138) each receive prompt 132 from classifier 135 and generate structured information 142, safety score 147 and intent score 152, which are passed to decision logic 160. In this case, functions 138 may each subscribe to an asynchronous messaging service (not shown) to which prompts 132 are posted and process the prompts asynchronously and post resulting structured information 142 to a separate asynchronous messaging service for consumption by decision logic 160, as further described below. In an example implementation, user interface 120 assigns to each prompt a job identification number, user identification number, and third-party service provider identifier. Communications between classifier 135, functions 138, and decision logic 160 include the prompt data (e.g., text, image, audio, and/or video data, or a universal resource identifier (URI) that identifies a memory location where the specific prompt data is accessible), the job identifier, the third-party service provider identifier, and the user identifier. The identifiers are included with prompt data and flow through service 130 so that when decision logic 160 receives structured information 142, safety scores 147, and intent scores 152, it can be matched up with prompt 132 and processed as further described below. In certain example implementations rules 155 are accessed that are defined by the corresponding third-party service provider, or a class of user 110.

In example architecture 105 shown in FIG. 1B, classifier 135, information extractor 140, generic content safety analyzer 145, and intent extractor 150 are individually called by one or more components of decision logic 160, e.g., via an inter-process communication or API, as generally known. In either of example architectures 100 and 105, processing of prompt by the various functions can be concurrent. In some cases, depending on rules 155, architecture 105 has a potential advantage that only necessary functions are called to perform operations on rules, further increasing processing efficiency of service 130 (e.g., by reducing computing and networking resources consumption). For example, different strategies can be followed to reduce the number of overall function calls based on the probability of certain rules being invoked. As an example, in cases where no rules for a particular user relate to intent scores 152, there is no need to call intent extractor 150.

Output handler 170 receives prompt 162 and passes prompt 172 (a copy of prompt 162) to GAI model 180, then receives response 174 from GAI model 180, prepends, or otherwise combines warning 164 (if any) to the response 174, and outputs combined response 124 to user interface 120.

Additional features or functions not herein specifically described may be included in service 130. For example, service 130 may store a record (not shown) of all interactions between user 110 and GAI model 180. Such a record may be provided to information extractor 140 as described above with reference to FIG. 2. In addition, an additional querying interface (not shown) for an external database (not shown) containing additional domain specific knowledge, or other contextual information, e.g., relating to user 110 may be provided. This other information 230 may also be provided to information extractor 140 as other information 230 as previously described, also with reference to FIG. 2.

Alternatively, the additional querying interface may be directly accessible by decision logic 160 for specifically defined rules included in rules 155. For example, a lightweight directory access protocol (LDAP) server (not shown) may be used to determine a class of user based on the user identifier, and then rules specific to that class of user can be applied to prompt 122.

Figure 4:
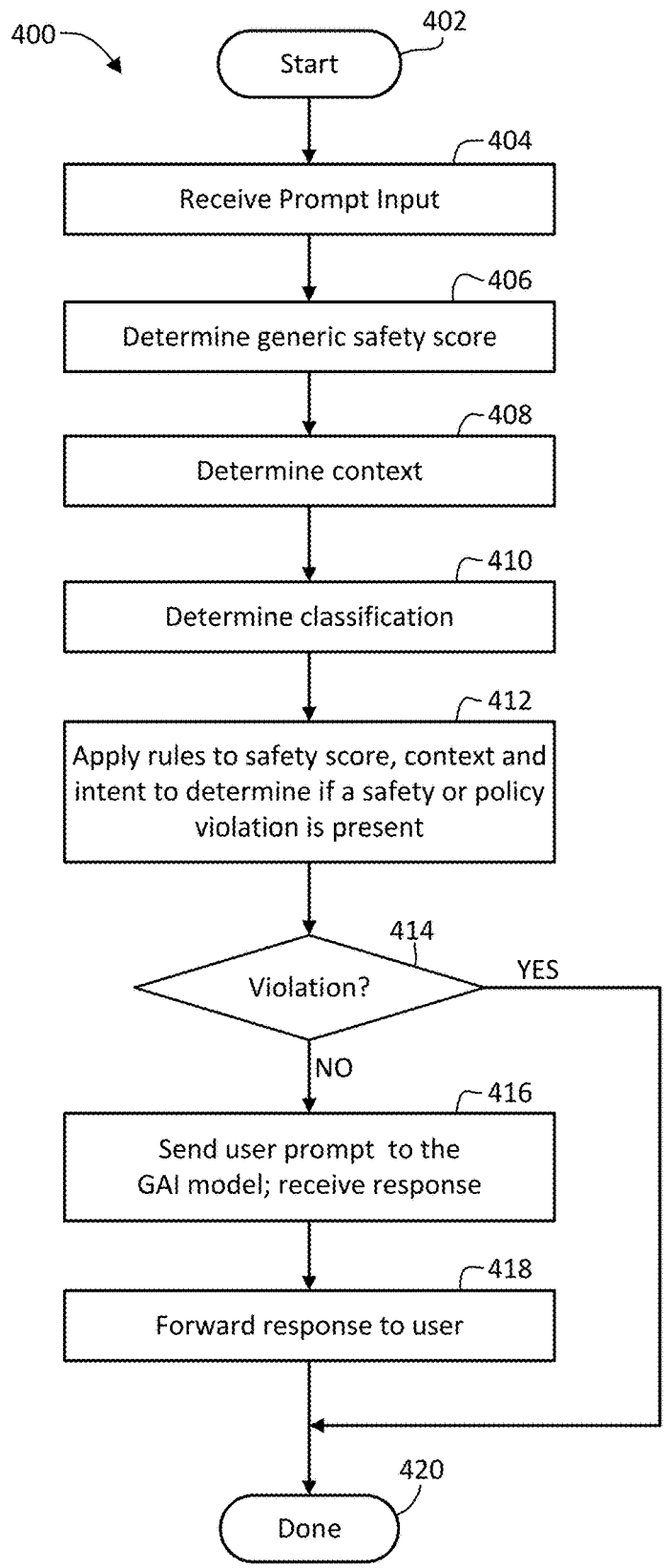
FIG. 4 shows a flowchart illustrating by way of example a procedure for providing context-aware domain-adapted content filtering for a GAI model.

FIG. 4 shows flowchart 400 illustrating by way of example a procedure for providing context-aware domain-adapted harmful content filtering for GAI models. The procedure begins as indicated by start block 402 and flows to operation 404, wherein an initial prompt 122 is received.

The procedure then flows to operation 406 in which a generic safety score is determined. In an example, decision logic 160 passes prompt 122 to generic content safety analyzer 145 and receives therefrom and in response thereto one or more generic content safety scores. Each generic content safety score indicates a confidence that the prompt is unsafe in a corresponding one of the safety categories including, e.g., self-harm, violence, hate speech, sexual content, and the like.

In operation 408, context is determined for prompt 122. In an example implementation, decision logic 160 passes prompt 122 to information extractor 140. In response thereto, decision logic 160 receives therefrom structured data that organizes information from prompt 122 according to an ontology specific to the knowledge domain of service 130.

In operation 410, a classification of prompt 122 is determined. In an example, decision logic 160 passes prompt 122 to classifier 135, and in response thereto receives therefrom a confidence determination that includes a confidence score that prompt 122 is related to a particular knowledge domain or subject matter category. In an example, service 130 is designed to provide pre-prompt filtering for GAI model 180 to handle queries in a medical field. In this manner, classifier 135 is used by decision logic 160 to determine a confidence score that prompt 122 is related to the medical field. Operations 408 may be performed concurrently or in series with operation 406.

Operations 406, 408, and 410 may be performed in series or in parallel by separate processes, as previously described. An order of operation may be modified. For example, if operation 410 determines that prompt 122 is unrelated to the knowledge domain of service 130, then the prompt may be rejected without performing operations 406 and 408.

Upon completion of operations 406-408 (e.g., because the necessary information was obtained therefrom) the procedure flows to operation 412 wherein rules 155 are applied to the safety score(s), context, and intent determinations. If a violation occurs, (for example, because the classification is below a confidence threshold defined by rules 155 or, as another example, because there are no permitted intent confidence scores above a threshold defined by rules 155) then prompt 122 is rejected by condition block 414 and the procedure skips to block 420. If no violation occurs in condition block 414, the procedure flows to operation 416.

In operation 416, prompt 122 is forwarded to GAI model 180, and in response thereto response 174 to prompt 122 is received from GAI model 180.

In operation 418, response 174 is forwarded to user 110. The procedure then ends as indicated by block 420.

Figure 5:
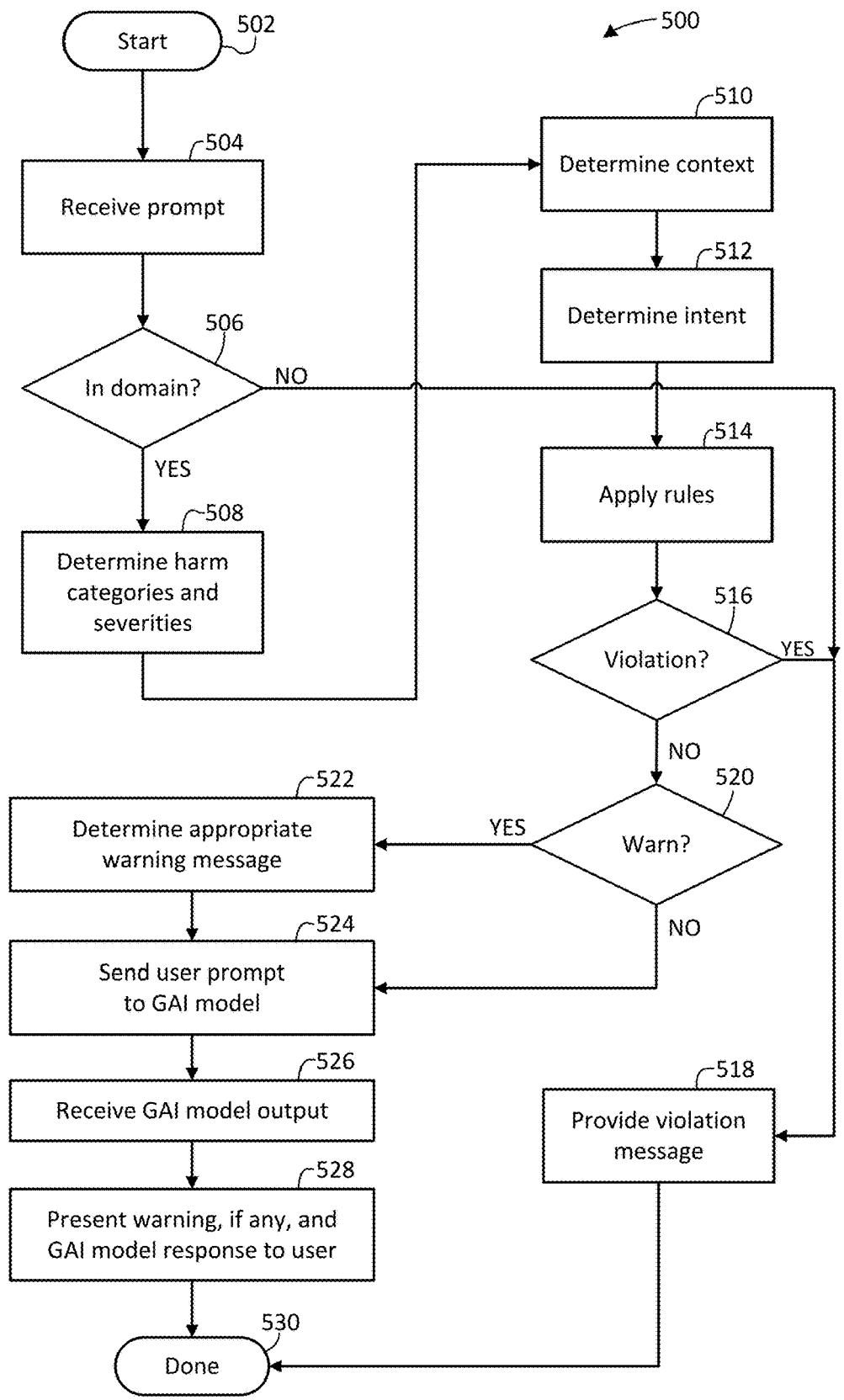
FIG. 5 shows another flowchart illustrating by way of example another procedure for context-aware domain-adapted pre-prompt content filtering.

FIG. 5 shows a more complex flowchart 500 illustrating by way of example another procedure for context-aware domain-adapted pre-prompt harmful content filtering. The procedure begins as indicated by start block 502 and flows to operation 504 wherein prompt 122 is received, e.g., from user 110 via user interface 120 as described above with reference to FIGS. 1A and 1B. Upon receiving prompt 122, the procedure flows to operation 506 wherein a determination is made as to whether prompt 122 is within a knowledge domain of service 130. In an example, prompt 122 is provided to classifier 135 described above with reference to FIGS. 1A, 1B, and in response thereto a confidence score indicating a level of confidence that prompt 122 lies within the knowledge domain is received. The confidence score is compared with a threshold, e.g., as defined by rules 155 or configured service-wide to determine if the prompt is sufficiently within knowledge domain of service 130 to continue processing. If prompt 122 is not sufficiently within the knowledge domain (or, in other words, classifier 135 lacks sufficient confidence that prompt 122 lies within the knowledge domain) then the procedure flows to operation 518 whereupon a violation message is returned to user 110. On the other hand, if classifier 135 returns a sufficiently high confidence score indicating that prompt 122 lies within the knowledge domain of service 130, then the procedure flows to operation 508.

In operation 508, a determination of harmful categories and corresponding confidence levels (severities) is determined. This is also referred to herein as "generic safety scores." In an embodiment, this determination is made by passing prompt 122 to generic content safety analyzer 145 which tests prompt 122 against a set of classifiers to detect whether prompt 122 includes content pertaining to one or more harmful content categories. Generic content safety analyzer 145 generates a confidence score associated with each harmful content category indicating a level of confidence that the prompt includes unsafe content in the corresponding category.

In operation 510, contextual information associated with prompt 122 is determined. In an embodiment, contextual information, also referred to herein as "structured information" is obtained by passing prompt 122, and possibly additional information as described hereinabove, to information extractor 140. In response thereto, information extractor 140 generates, from the prompt and any additional information provided, and using an ontology specific to the knowledge domain of service 130, structured contextual data extracted from the prompt and any additional information provided.

In operation 512, a user intent is determined. In an embodiment, intent is determined by passing prompt 122 to intent extractor 150, described above with reference to FIGS. 1A, 1B. Intent extractor 150 generates confidence scores for classifying prompt 122 as belonging to one of a plurality of permissible intents within the knowledge domain of service 130.

In operation 514, rules are applied to the determined harm categories confidence scores, contextual information, and intent confidence score(s) as described above with reference to FIGS. 1A, 1B. For example, rules 155 are consulted and applied to the extracted and determined information of the previous steps. Upon applying the rules, a result is either (1) a violation, (2) prompt submission with a warning, or (3) prompt submission no warning.

In operation 516, a determination as to whether a violation has occurred as a result of the application of rules 155 in operation 514. If so, the procedure flows to operation 518 whereupon a violation message is returned to user 110 and the procedure ends as indicated by block 530. If no violation has occurred, the procedure flows to operation 520.

In operation 520, it is determined whether application of rules 155 in operation 514 resulted in a warning message being identified for the prompt. If so, the procedure flows to operation 522 whereupon a warning message is determined. In examples, the warning message is defined by a provider of filtering service 130, or by the third-party service provider that defined rules 155 as previously described. Once the warning message is determined, or in the case of no warning message being identified in operation 520, the procedure flows to operation 524.

In operation 524, user prompt 122 is forwarded to GAI model 180, e.g. by output handler 170. In response thereto, GAI model 180 generates an output response 174 which is received by output hander 170 in operation 526.

In operation 528, the warning, if any, and response 174 are presented to user 110, e.g., via the user interface 120 by output handler 170. The procedure then ends as indicated by block 530.

Additional Examples

An example system provides context-aware content filtering for a Generative artificial intelligence (GAI) models specific to a knowledge domain. The system includes a processor and a data storage device storing thereon data and instructions, the instructions causing the one or more processors of the GAI model to perform a method. The instructions comprise: receiving a prompt from a user via a user interface; determining, from a classifier, a classification confidence score indicating a level of confidence that the prompt is associated with the knowledge domain; comparing the classification confidence score to a threshold; forwarding a violation notice to the user interface without submitting the prompt to the GAI model when the classification confidence score is below the threshold; and responsive to the classification confidence score being above the threshold: composing context information from the prompt, the context information comprising structured information extracted from the prompt using an ontology of the knowledge domain; evaluating the context information according to rules for the prompt, the evaluating producing a result, the result being one of a determination that the prompt violates the rules or a determination that the prompt is not in violation of the rules; when the result is the determination that the prompt violates the rules, forwarding a violation notice to the user interface without submitting the prompt to the GAI model; and when the result is the determination that the prompt is not in violation of the rules, submitting the prompt to the GAI model, receiving a response from the GAI model, and forwarding the response to the user interface.

Alternatively, or in addition to the other examples described herein, examples include any combination of the following:

Wherein the method further comprises, responsive to the classification confidence score being above the threshold: determining a generic safety score for the prompt, the generic safety score being, for a harmful content category, a determination by a generic content safety analyzer of a level of confidence that the prompt includes content corresponding to the harmful content category; determining an intent score of the prompt, the intent score being a measure of confidence that the prompt is related to an approved category of information; and wherein the evaluating further comprises evaluating the generic safety score and the intent score according to the rules for the prompt to produce the result.

Wherein the result is the determination that the prompt is not in violation of the rules and the method further comprises: in response to the determination that the prompt is not in violation of the rules, determining, based on the rules as applied to the generic safety score, the context information, and the intent score, that a warning message is appropriate for the prompt; and responsive to the determining that the warning message is appropriate, forwarding the warning message to the user interface with the response from the GAI model.

Wherein the method further comprises, responsive to the classification confidence score being above the threshold: determining a generic safety score for the prompt, the generic safety score being, for a harmful content category, a determination by a generic content safety analyzer of a level of confidence that the prompt includes content corresponding to the harmful content category; and wherein the evaluating further comprises evaluating the generic safety score according to the rules for the prompt to produce the result.

Wherein the result is the determination that the prompt is not in violation of the rules and the method further comprises: in response to the determination that the prompt is not in violation of the rules, determining, based on the rules as applied to the context information, that a warning message is appropriate for the prompt; and responsive to the determining that the warning message is appropriate, forwarding the warning message to the user interface with the response from the GAI model.

Wherein the prompt is received via one of a plurality of third-party providers and the rules are defined for the user by the third-party provider, the method further comprising: receiving via the user interface, a second prompt from a second user, the second prompt being received from the second user via a second third-party provider; composing second context information from the second prompt, the second context information comprising second structured information extracted from the second prompt using the ontology of the knowledge domain; evaluating the second context information according to other rules for the second prompt, the evaluating producing a second result, wherein the other rules are defined by the second third-party provider; when the second result is the determination that the second prompt violates the other rules, forwarding a violation notice to the second user via the user interface without submitting the second prompt to the GAI model; and when the second result is the determination that the second prompt is not in violation of the other rules, submitting the second prompt to the GAI model, receiving a response to the second prompt from the GAI model, and forwarding the response to the second prompt to the second user via the user interface.

Wherein the method further comprises, responsive to the classification confidence score being above the threshold: determining an intent score of the prompt, the intent score being a measure of confidence that the prompt is related to an approved category of information; and wherein the evaluating further comprises evaluating the intent score according to the rules for the prompt to produce the result.

An example method provides context-aware content filtering for a generative artificial intelligence (GAI) model specific to a knowledge domain. The method comprises: receiving a prompt from a user via a user interface; determining, from a classifier, a classification confidence score indicating a level of confidence that the prompt is associated with the knowledge domain; comparing the classification confidence score to a threshold; forwarding a violation notice to the user interface without submitting the prompt to the GAI model when the classification confidence score is below the threshold; and responsive to the classification confidence score being above the threshold: determining an intent score of the prompt, the intent score being a measure of confidence that the prompt is related to an approved category of information; evaluating the intent score according to a rule for the prompt, the evaluating producing a result, the result being one of a determination that the prompt violates the rule or a determination that the prompt is not in violation of the rule; when the result is the determination that the prompt violates the rule, forwarding a violation notice to the user interface without submitting the prompt to the GAI model; and when the result is the determination that the prompt is not in violation of the rules, submitting the prompt to the GAI model, receiving a response from the GAI model, and forwarding the response to the user interface.

Alternatively, or in addition to the other examples described herein, examples include any combination of the following:

- Responsive to the classification confidence score being above the threshold: determining a generic safety score for the prompt, the generic safety score being, for a harmful content category, a determination by a generic content safety analyzer of a level of confidence that the prompt includes content corresponding to the harmful content category; composing context information from the prompt, the context information comprising structured information extracted from the prompt using an ontology of the knowledge domain; and wherein the evaluating further comprises evaluating the generic safety score and the context information according to the rules for the prompt to produce the result.
- Wherein the result is the determination that the prompt is not in violation of the rules and the method further comprises: in response to the determination that the prompt is not in violation of the rules, determining, based on the rules as applied to the generic safety score, the context information, and the intent score, that a warning message is appropriate for the prompt; and responsive to the determining that the warning message is appropriate, forwarding the warning message to the user interface with the response from the GAI model.
- Responsive to the classification confidence score being above the threshold: determining a generic safety score for the prompt, the generic safety score being, for a harmful content category, a determination by a generic content safety analyzer of a level of confidence that the prompt includes content corresponding to the harmful content category; and wherein the evaluating further comprises evaluating the generic safety score according to the rules for the prompt to produce the result.
- Wherein the result is the determination that the prompt is not in violation of the rules and the method further comprises: in response to the determination that the prompt is not in violation of the rules, determining, based on the rules as applied to the context information, that a warning message is appropriate for the prompt; and responsive to the determining that the warning message is appropriate, forwarding the warning message to the user interface with the response from the GAI model.
- Wherein the prompt is received via one of a plurality of third-party providers and the rules are defined for the user by the third-party provider, the method further comprising: receiving via the user interface, a second prompt from a second user, the second prompt being received from the second user via a second third-party provider; composing second context information from the second prompt, the second context information comprising second structured information extracted from the second prompt using the ontology of the knowledge domain; evaluating the second context information according to other rules for the prompt, the evaluating producing a second result, wherein the other rules are defined by the second third-party provider; when the second result is the determination that the prompt violates the other rules, forwarding a violation notice to the second user via the user interface without submitting the second prompt to the GAI model; and when the second result is the determination that the second prompt is not in violation of the other rules, submitting the second prompt to the GAI model, receiving a response to the second prompt from the GAI model, and forwarding the response to the second prompt to the second user via the user interface.
- Responsive to the classification confidence score being above the threshold: composing context information from the prompt, the context information comprising structured information extracted from the prompt using an ontology of the knowledge domain; and wherein the evaluating further comprises evaluating the context information according to the rules for the prompt to produce the result.

A computer storage medium embodies instructions causing a processor to perform a method for providing context-aware content filtering for a generative artificial intelligence (GAI) model specific to a knowledge domain. The method comprises: receiving a prompt from a user via a user interface; composing context information from the prompt, the context information comprising structured information extracted from the prompt using an ontology of the knowledge domain; evaluating the context information according to rules for the prompt, the evaluating producing a result, the result being one of a determination that the prompt violates the rules or a determination that the prompt is not in violation of the rules; when the result is the determination that the prompt violates the rules, forwarding a violation notice to the user interface without submitting the prompt to the GAI model; and when the result is the determination that the prompt is not in violation of the rules, submitting the prompt to the GAI model, receiving a response from the GAI model, and forwarding the response to the user interface.

Alternatively, or in addition to the other examples described herein, examples include any combination of the following:

- Wherein the method further comprises, responsive to the classification confidence score being above the threshold: determining a generic safety score for the prompt, the generic safety score being, for a harmful content category, a determination by a generic content safety analyzer of a level of confidence that the prompt includes content corresponding to the harmful content category; determining an intent score of the prompt, the intent score being a measure of confidence that the prompt is related to an approved category of information; and wherein the evaluating further comprises evaluating the generic safety score and the intent score according to the rules for the prompt to produce the result.

Wherein the result is the determination that the prompt is not in violation of the rules and the method further comprises: in response to the determination that the prompt is not in violation of the rules, determining, based on the rules as applied to the generic safety score, the context information, and the intent score, that a warning message is appropriate for the prompt; and responsive to the determining that the warning message is appropriate, forwarding the warning message to the user interface with the response from the GAI model.

Wherein the result is the determination that the prompt is not in violation of the rules and the method further comprises: determining, from a classifier, a classification confidence score indicating a level of confidence that the prompt is associated with the knowledge domain; determining that the classification confidence score exceeds a threshold; responsive to the classification confidence score being above the threshold, performing the evaluating of the context information according to the rules.

Wherein the method further comprises, responsive to the classification confidence score being above the threshold: determining an intent score of the prompt, the intent score being a measure of confidence that the prompt is related to an approved category of information.

Wherein the evaluating further comprises evaluating the intent score according to the rules for the prompt to produce the result.

Example Operating Environment

Figure 6:
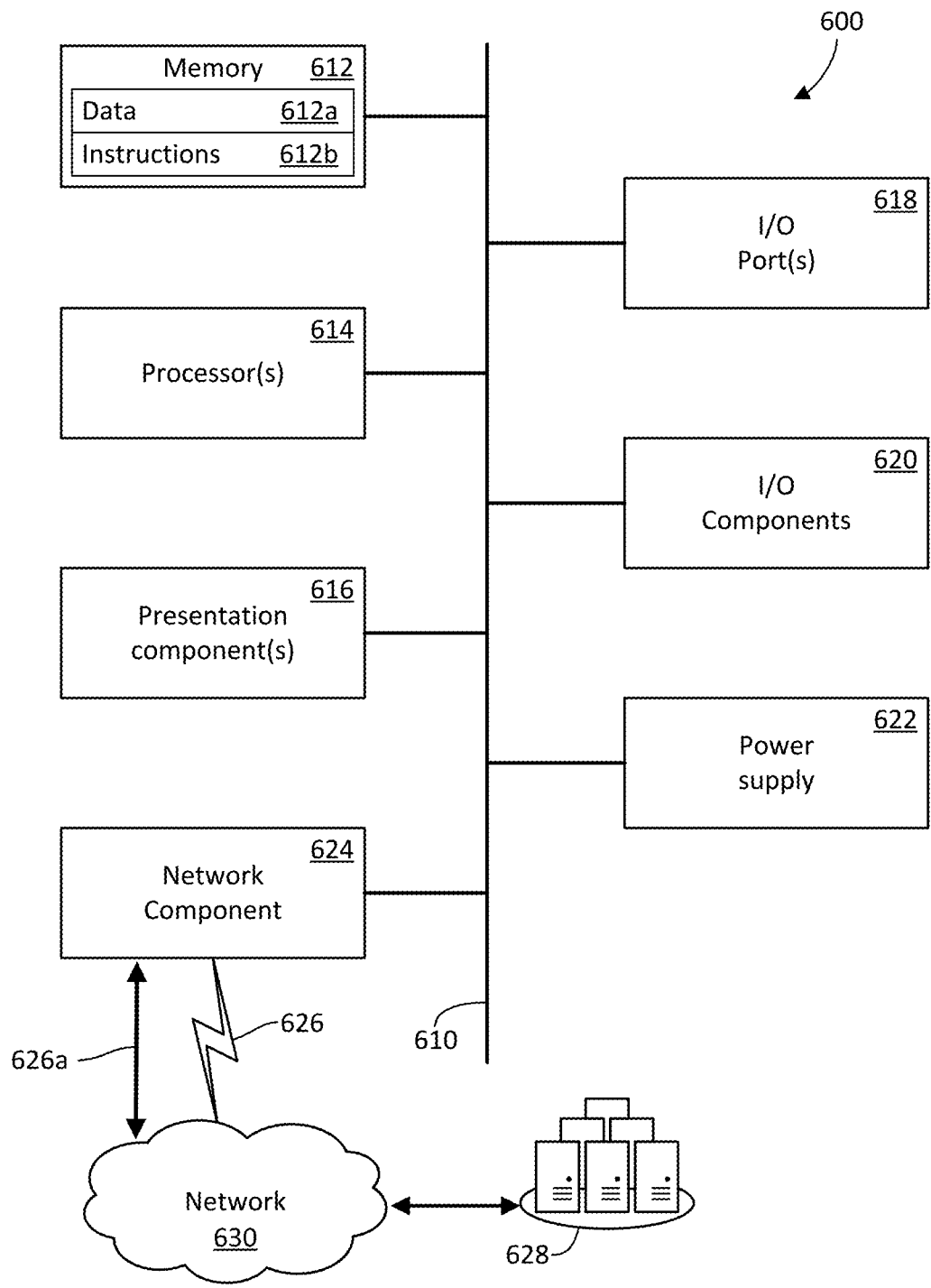
FIG. 6 is a block diagram of an example computing device for implementing aspects of the system.

FIG. 6 is a block diagram of an example computing device 600 for implementing aspects disclosed herein and is designated generally as computing device 600. In some examples, one or more computing devices 600 are provided for an on-premises computing solution. In some examples, one or more computing devices 600 are provided as a cloud computing solution. In some examples, a combination of on-premises and cloud computing solutions are used. Computing device 600 is but one example of a suitable computing environment and is not intended to suggest any limitation as to the scope of use or functionality of the examples disclosed herein, whether used singly or as part of a larger set. Neither should computing device 600 be interpreted as having any dependency or requirement relating to any one or combination of components/modules illustrated. The examples disclosed herein can be described in the general context of computer code or machine-useable instructions, including computer-executable instructions such as program components, being executed by a computer or other machine, such as a mobile phone or other handheld device. Generally, program components including routines, programs, objects, components, data structures, and the like, refer to code that performs particular tasks, or implement particular data types. The disclosed examples can be practiced in a variety of system configurations, including server computers, virtual machines, personal computers, laptops, smart phones, mobile tablets, hand-held devices, consumer electronics, specialty computing devices, etc. The disclosed examples can also be practiced in distributed computing environments when tasks are performed by remote-processing devices that are linked through a communications network.

Computing device 600 includes a bus 610 that directly or indirectly couples the following devices: computer storage memory 612, one or more processors 614, one or more presentation components 616, input/output (I/O) ports 618, I/O components 620, a power supply 622, and a network component 624. While computing device 600 is depicted as a seemingly single device, multiple computing devices 600 can work together and share the depicted device resources. As such, in certain examples, memory 612 is distributed across multiple devices, and processor(s) 1014 is housed with different devices.

Bus 610 represents one or more buses (such as an address bus, data bus, or a combination thereof). Although the various blocks of FIG. 6 are shown with lines for the sake of clarity, delineating various components can be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 6 and the references herein to a "computing device." Memory 612 can take the form of the computer storage media referenced below and operatively provide storage of computer-readable instructions, data structures, program modules and other data for the computing device 600. In some examples, memory 612 stores one or more of an operating system, a universal application platform, or other program modules and program data. Memory 612 is thus able to store and access data 612*a* and instructions 612*b* that are executable by processor 614 and configured to carry out the various operations disclosed herein.

In some examples, memory 612 includes computer storage media. Memory 612 can include any quantity of memory associated with or accessible by the computing device 600. Memory 612 can be internal to the computing device 600 (as shown in FIG. 6), external to the computing device 600 (not shown), or both (not shown). Additionally, or alternatively, the memory 612 can be distributed across multiple computing devices 600, for example, in a virtualized environment in which instruction processing is carried out on multiple computing devices 600. For the purposes of this disclosure, "computer storage media," "computer-storage memory," "memory," and "memory devices" are synonymous terms for the computer-storage memory 612, and none of these terms include carrier waves or propagating signaling. Computer storage media is therefore non-transitory.

Processor(s) 614 includes any quantity of processing units that read data from various entities, such as memory 612 or I/O components 620. Specifically, processor(s) 614 are programmed to execute computer-executable instructions for implementing aspects of the disclosure. The instructions can be performed by the processor, by multiple processors within the computing device 600, or by a processor external to the client computing device 600. In some examples, the processor(s) 614 are programmed to execute instructions such as those illustrated in the flow charts discussed below and depicted in the accompanying drawings. Moreover, in some examples, processor(s) 614 represent an implementation of analog techniques to perform the operations described herein. For example, the operations are performed by an analog client computing device 600 and/or a digital client computing device 600. Presentation component(s) 616 present data indications to a user or other device. Exemplary presentation components include a display device, speaker, printing component, vibrating component, etc. It should be understood that computer data can be presented in a number of ways, such as visually in a graphical user interface (GUI), audibly through speakers, wirelessly between computing devices 600, across a wired connection, or in other ways. I/O ports 618 allow computing device 600 to be logically coupled to other devices including I/O components 620, some of which can be built in. Example I/O components 620 include, for example but without limitation, a microphone, joystick, game pad, satellite dish, scanner, printer, wireless device, etc.

Computing device 600 can operate in a networked environment via the network component 624 using logical connections to one or more remote computers. In some examples, the network component 624 includes a network interface card and/or computer-executable instructions (e.g., a driver) for operating the network interface card. Communication between the computing device 600 and other devices can use any protocol or mechanism over any wired or wireless connection. In some examples, network component 624 is operable to communicate data over public, private, or hybrid (public and private) using a transfer protocol, between devices wirelessly using short range communication technologies (e.g., near-field communication (NFC), Bluetooth® branded communications, or the like), or a combination thereof. Network component 624 communicates over wireless communication link 626 and/or a wired communication link 626a to a remote resource 628 (e.g., a cloud resource) across network 630. Various different examples of communication links 626 and 626a include a wireless connection, a wired connection, and/or a dedicated link, and in some examples, at least a portion is routed through the internet.

Although described in connection with an example computing device 600, examples of the disclosure are capable of implementation with numerous other general-purpose or special-purpose computing system environments, configurations, or devices. Examples of well-known computing systems, environments, and/or configurations that suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices might accept input from the user in any way, including from input devices such as a keyboard or pointing device, via gesture input, proximity input (such as by hovering), and/or via voice input.

Examples are described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform particular tasks or implement particular abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium for storing information for access by a computing device. In contrast, communication media typically embody computer readable instructions, data structures, program modules, or the like in a modulated data signal such as a carrier wave or other transport mechanism and include any information delivery media.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In examples involving a general-purpose computer, aspects of the disclosure transform the general-purpose computer into a special-purpose computing device when configured to execute the instructions described herein.

It will be understood that the benefits and advantages described above can relate to one embodiment or to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures are implemented as software instructions encoded on a computer storage medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

As used herein, the term "set" is non-empty, and can also be referred to as a "group."

When introducing elements of aspects of the disclosure or the examples thereof, the articles "a," "an," "the," and "said" are intended to mean that there are one or more of the elements. The terms "comprising," "including," and "having" are intended to be inclusive and mean that there might be additional elements other than the listed elements. The term "exemplary" is intended to mean "an example of." The phrase "one or more of the following: A, B, and C" means "at least one of A and/or at least one of B and/or at least one of C."

While the aspects of the disclosure have been described in terms of various examples with their associated operations, a person skilled in the art would appreciate that a combination of operations from any number of different examples is also within scope of the aspects of the disclosure.

What is claimed is:

1. A system for providing context-aware content filtering for a generative artificial intelligence (GAI) model specific to a knowledge domain, the system comprising:
 a processor and a data storage device storing thereon data and instructions, the instructions causing the one or more processors of the GAI model to perform:
  receiving a prompt from a user via a user interface;
  determining, from a classifier, a classification confidence score indicating a level of confidence that the prompt is associated with the knowledge domain;
  comparing the classification confidence score to a threshold;
  forwarding a violation notice to the user interface without submitting the prompt to the GAI model when the classification confidence score is below the threshold; and
  responsive to the classification confidence score being above the threshold:
   composing context information from the prompt, the context information comprising structured information extracted from the prompt using an ontology of the knowledge domain;
   evaluating the context information according to rules for the prompt, the evaluating producing a result, the result being one of a determination that the prompt violates the rules or a determination that the prompt is not in violation of the rules;
   when the result is the determination that the prompt violates the rules, forwarding a violation notice to the user interface without submitting the prompt to the GAI model; and
   when the result is the determination that the prompt is not in violation of the rules, submitting the prompt to the GAI model, receiving a response from the GAI model, and forwarding the response to the user interface.

2. The system of claim 1, wherein the instructions further comprise, responsive to the classification confidence score being above the threshold:
 determining a generic safety score for the prompt, the generic safety score being, for a harmful content category, a determination by a generic content safety analyzer of a level of confidence that the prompt includes content corresponding to the harmful content category;
 determining an intent score of the prompt, the intent score being a measure of confidence that the prompt is related to an approved category of information; and
 wherein the evaluating further comprises evaluating the generic safety score and the intent score according to the rules for the prompt to produce the result.

3. The system of claim 2, wherein the result is the determination that the prompt is not in violation of the rules and the instructions further comprise:
 in response to the determination that the prompt is not in violation of the rules, determining, based on the rules as applied to the generic safety score, the context information, and the intent score, that a warning message is appropriate for the prompt; and
 responsive to the determining that the warning message is appropriate, forwarding the warning message to the user interface with the response from the GAI model.

4. The system of claim 1, wherein the instructions further comprise, responsive to the classification confidence score being above the threshold:
 determining a generic safety score for the prompt, the generic safety score being, for a harmful content category, a determination by a generic content safety analyzer of a level of confidence that the prompt includes content corresponding to the harmful content category; and
 wherein the evaluating further comprises evaluating the generic safety score according to the rules for the prompt to produce the result.

5. The system of claim 1, wherein the result is the determination that the prompt is not in violation of the rules and the instructions further comprise:
 in response to the determination that the prompt is not in violation of the rules, determining, based on the rules as applied to the context information, that a warning message is appropriate for the prompt; and
 responsive to the determining that the warning message is appropriate, forwarding the warning message to the user interface with the response from the GAI model.

6. The system of claim 1, wherein the prompt is received via one of a plurality of third-party providers and the rules are defined for the user by the third-party provider, the instructions further comprising:
 receiving via the user interface, a second prompt from a second user, the second prompt being received from the second user via a second third-party provider;
 composing second context information from the second prompt, the second context information comprising second structured information extracted from the second prompt using the ontology of the knowledge domain;
 evaluating the second context information according to other rules for the second prompt, the evaluating producing a second result, wherein the other rules are defined by the second third-party provider;
 when the second result is the determination that the second prompt violates the other rules, forwarding a violation notice to the second user via the user interface without submitting the second prompt to the GAI model; and
 when the second result is the determination that the second prompt is not in violation of the other rules, submitting the second prompt to the GAI model, receiving a response to the second prompt from the GAI model, and forwarding the response to the second prompt to the second user via the user interface.

7. The system of claim 1, wherein the instructions further comprise, responsive to the classification confidence score being above the threshold:
   determining an intent score of the prompt, the intent score being a measure of confidence that the prompt is related to an approved category of information; and
   wherein the evaluating further comprises evaluating the intent score according to the rules for the prompt to produce the result.

8. A computerized method for providing context-aware content filtering for a generative artificial intelligence (GAI model specific to a knowledge domain, the method comprising:
   receiving a prompt from a user via a user interface;
   determining, from a classifier, a classification confidence score indicating a level of confidence that the prompt is associated with the knowledge domain;
   comparing the classification confidence score to a threshold;
   forwarding a violation notice to the user interface without submitting the prompt to the GAI model when the classification confidence score is below the threshold; and
   responsive to the classification confidence score being above the threshold:
      determining an intent score of the prompt, the intent score being a measure of confidence that the prompt is related to an approved category of information; evaluating the intent score according to a rule for the prompt, the evaluating producing a result, the result being one of a determination that the prompt violates the rule or a determination that the prompt is not in violation of the rule;
      when the result is the determination that the prompt violates the rule, forwarding a violation notice to the user interface without submitting the prompt to the GAI model; and
      when the result is the determination that the prompt is not in violation of the rules, submitting the prompt to the GAI model, receiving a response from the GAI model, and forwarding the response to the user interface.

9. The method of claim 8, further comprising, responsive to the classification confidence score being above the threshold:
   determining a generic safety score for the prompt, the generic safety score being, for a harmful content category, a determination by a generic content safety analyzer of a level of confidence that the prompt includes content corresponding to the harmful content category;
   composing context information from the prompt, the context information comprising structured information extracted from the prompt using an ontology of the knowledge domain; and
   wherein the evaluating further comprises evaluating the generic safety score and the context information according to the rules for the prompt to produce the result.

10. The method of claim 9, wherein the result is the determination that the prompt is not in violation of the rules and the method further comprises:
    in response to the determination that the prompt is not in violation of the rules, determining, based on the rules as applied to the generic safety score, the context information, and the intent score, that a warning message is appropriate for the prompt; and
    responsive to the determining that the warning message is appropriate, forwarding the warning message to the user interface with the response from the GAI model.

11. The method of claim 8, further comprising, responsive to the classification confidence score being above the threshold:
    determining a generic safety score for the prompt, the generic safety score being, for a harmful content category, a determination by a generic content safety analyzer of a level of confidence that the prompt includes content corresponding to the harmful content category; and
    wherein the evaluating further comprises evaluating the generic safety score according to the rules for the prompt to produce the result.

12. The method of claim 8, wherein the result is the determination that the prompt is not in violation of the rules and the method further comprises:
    in response to the determination that the prompt is not in violation of the rules, determining, based on the rules as applied to the context information, that a warning message is appropriate for the prompt; and
    responsive to the determining that the warning message is appropriate, forwarding the warning message to the user interface with the response from the GAI model.

13. The method of claim 8, wherein the prompt is received via one of a plurality of third-party providers and the rules are defined for the user by the third-party provider, the method further comprising:
    receiving via the user interface, a second prompt from a second user, the second prompt being received from the second user via a second third-party provider;
    composing second context information from the second prompt, the second context information comprising second structured information extracted from the second prompt using the ontology of the knowledge domain;
    evaluating the second context information according to other rules for the prompt, the evaluating producing a second result, wherein the other rules are defined by the second third-party provider;
    when the second result is the determination that the prompt violates the other rules, forwarding a violation notice to the second user via the user interface without submitting the second prompt to the GAI model; and
    when the second result is the determination that the second prompt is not in violation of the other rules, submitting the second prompt to the GAI model, receiving a response to the second prompt from the GAI model, and forwarding the response to the second prompt to the second user via the user interface.

14. The method of claim 8, further comprising, responsive to the classification confidence score being above the threshold:
    composing context information from the prompt, the context information comprising structured information extracted from the prompt using an ontology of the knowledge domain; and
    wherein the evaluating further comprises evaluating the context information according to the rules for the prompt to produce the result.

15. A computer storage medium embodying instructions which, on execution by a processor, cause the processor to perform operations comprising:
    receiving a prompt from a user via a user interface;

composing context information from the prompt, the context information comprising structured information extracted from the prompt using an ontology of a knowledge domain;

evaluating the context information, the evaluating producing a result, the result being one of a determination that the prompt is in violation or a determination that the prompt is not in violation;

when the result is the determination that the prompt is in violation, forwarding a violation notice to the user interface without submitting the prompt to a generative artificial intelligence (GAI) model; and when the result is the determination that the prompt is not in violation, submitting the prompt to the GAI model, receiving a response from the GAI model, and forwarding the response to the user interface.

16. The computer storage medium of claim 15, wherein the instructions further comprise, responsive to the classification confidence score being above the threshold:

determining a generic safety score for the prompt, the generic safety score being, for a harmful content category, a determination by a generic content safety analyzer of a level of confidence that the prompt includes content corresponding to the harmful content category;

determining an intent score of the prompt, the intent score being a measure of confidence that the prompt is related to an approved category of information; and wherein the evaluating further comprises evaluating the generic safety score and the intent score to produce the result.

17. The computer storage medium of claim 16, wherein the result is the determination that the prompt is not in violation and the instructions further comprise:

in response to the determination that the prompt is not in violation, determining, based on rules as applied to the generic safety score, the context information, and the intent score, that a warning message is appropriate for the prompt; and responsive to the determining that the warning message is appropriate, forwarding the warning message to the user interface with the response from the GAI model.

18. The computer storage medium of claim 15, wherein the result is the determination that the prompt is not in violation and the instructions further comprise:

determining, from a classifier, a classification confidence score indicating a level of confidence that the prompt is associated with the knowledge domain;

determining that the classification confidence score exceeds a threshold;

responsive to the classification confidence score being above the threshold, performing the evaluating of the context information.

19. The computer storage medium of claim 15, wherein the instructions further comprise, responsive to the classification confidence score being above the threshold:

determining an intent score of the prompt, the intent score being a measure of confidence that the prompt is related to an approved category of information.

20. The computer storage medium of claim 19, wherein the evaluating further comprises evaluating the intent score according to rules for the prompt to produce the result.

* * * * *